United States Patent
Levy et al.

(10) Patent No.: US 9,134,056 B2
(45) Date of Patent: Sep. 15, 2015

(54) AIR COOLED ABSORPTION COOLING SYSTEM OPERABLE BY LOW GRADE HEAT

(75) Inventors: Avi Levy, Beer Sheva (IL); Michael Jelinek, Beer Sheva (IL); Irene Borde, Jerusalem (IL)

(73) Assignee: Ben-Gurion University of the Negev Research and Development Authority, Beer-Sheva (IL)

(*) Notice: Subject to any disclaimer, the term of this patent is extended or adjusted under 35 U.S.C. 154(b) by 715 days.

(21) Appl. No.: 13/394,168

(22) PCT Filed: Sep. 6, 2010

(86) PCT No.: PCT/IL2010/000734
§ 371 (c)(1),
(2), (4) Date: Jul. 13, 2012

(87) PCT Pub. No.: WO2011/027350
PCT Pub. Date: Mar. 10, 2011

(65) Prior Publication Data
US 2012/0266618 A1    Oct. 25, 2012

Related U.S. Application Data

(60) Provisional application No. 61/240,212, filed on Sep. 6, 2009.

(51) Int. Cl.
*F25B 25/02* (2006.01)
*F24F 3/14* (2006.01)
*F25B 15/02* (2006.01)

(52) U.S. Cl.
CPC ............... *F25B 25/02* (2013.01); *F24F 3/1417* (2013.01); *F25B 15/02* (2013.01); *Y02B 30/62* (2013.01)

(58) Field of Classification Search
CPC .......... F25B 25/02; F25B 15/02; F25B 15/12; F24F 3/1417
USPC .......... 62/2, 112, 238.3, 324.2, 476, 484, 489
See application file for complete search history.

(56) References Cited

U.S. PATENT DOCUMENTS 3,301,000 A * 1/1967 Holbay ........................... 62/141
3,440,832 A * 4/1969 Aronson ......................... 62/101

(Continued)

FOREIGN PATENT DOCUMENTS

WO    2007/110854 A2    10/2007
WO    2011/027350 A3    3/2011

OTHER PUBLICATIONS

Hussein, "Solar Energy Refrigeration by Liquid-Solid Adsorption Technique," An-Najah National University Faculty of Graduate Studies Dissertation (2008), retrieved Mar. 1, 2012 from the Internet: <URL: http://www.najah.edu/thesis/5171609.pdf>.

*Primary Examiner* — Emmanuel Duke
(74) *Attorney, Agent, or Firm* — Arnold & Porter LLP

(57) ABSTRACT

An air-cooled absorption refrigerating system and method is provided An evaporated refrigerant is mixed with a weak refrigerant stream Portions of the evaporated refrigerant are absorbed into the weak refrigerant stream via air-cooled absorber means to form a reconstituted solution which is pumped into heater means in heat exchange relationship with a hot weak refrigerant. The hot weak refrigerant stream is conducted therefrom Refrigerant is evaporated from the reconstituted solution via generator means in heat exchange relationship with a heat transfer fluid The generator means stream is separated into a hot weak refrigerant stream and a main refrigerant vapor stream The main refrigerant vapor stream is condensed via air-cooled condenser means The pressure of a condensed refrigerant vapor stream is reduced and conducted into evaporator means, where it is evaporated to form an evaporated refrigerant stream and conducted therefrom.

31 Claims, 7 Drawing Sheets

(56) References Cited

U.S. PATENT DOCUMENTS

| | | | |
|---|---|---|---|
| 3,623,333 A | | 11/1971 | Swenson |
| 3,817,050 A | * | 6/1974 | Alexander et al. ............. 62/101 |
| 4,031,712 A | * | 6/1977 | Costello ........................ 62/483 |
| 4,171,619 A | | 10/1979 | Clark |
| 4,285,211 A | * | 8/1981 | Clark ............................ 62/335 |
| 4,373,347 A | * | 2/1983 | Howell et al. ................. 62/112 |
| 4,702,085 A | * | 10/1987 | Gockel et al. ................. 62/101 |
| 4,793,940 A | * | 12/1988 | Borde et al. ................... 252/69 |
| 4,843,841 A | * | 7/1989 | Vork et al. ..................... 62/476 |
| 5,105,633 A | * | 4/1992 | Briggs ........................... 62/434 |
| 5,237,839 A | * | 8/1993 | Dehne ........................... 62/476 |
| 5,490,393 A | * | 2/1996 | Fuesting et al. ............... 62/101 |
| 6,101,832 A | | 8/2000 | Franz et al. |
| 6,158,237 A | | 12/2000 | Riffat et al. |
| 2008/0016902 A1 | | 1/2008 | Artsiely |
| 2008/0016903 A1 | * | 1/2008 | Artsiely ........................ 62/476 |
| 2009/0272134 A1 | * | 11/2009 | Hulse et al. ................... 62/112 |

* cited by examiner

AIR COOLED ABSORPTION COOLING SYSTEM OPERABLE BY LOW GRADE HEAT

CROSS-REFERENCE TO RELATED APPLICATIONS

This application is a national phase under 35 U.S.C. 371 of International Application No. PCT/IL2010/000734, which was filed on Sep. 6, 2010, which claims the benefit of the filing date of U.S. Provisional Application No. 61/240,212, filed on Sep. 6, 2009, the contents of each of which are herein incorporated by reference in their entirety.

FIELD OF THE INVENTION

The present invention generally relates to absorption cooling systems. More particularly, the invention relates to a method and system for air cooled TPL (triple pressure level) absorption cooling that can be operated by low grade heat.

BACKGROUND OF THE INVENTION

The present invention provides an absorption cooling system that can be operated utilizing relatively low grade heat sources e.g., solar energy, low-grade steam source, and industrial processes exhaust heat.

Typical absorption cooling systems utilize a heat source to vaporize under pressure a refrigerant material from a rich solution (generator/desorber). The pressurized desorbed refrigerant is then condensed by rejecting heat from it to the ambient surrounding, and it is then used for cooling by evaporating it under lower pressure conditions, whereby ambient heat is absorbed from the refrigerated space. The evaporated refrigerant is then absorbed back into the weak solution (absorber) to provide a reconstituted (rich) solution as the process is continuously repeated.

U.S. Pat. No. 4,171,619 describers a refrigeration system wherein heat from a solar energy source heats a refrigerant and absorbent solution in a generator to provide a refrigerant vapor to condensing and evaporating means, and wherein a compressor is used to compress vapor passing from the evaporator to the absorber, or between the evaporator and the condenser, and a pump is used for pressurizing the reconstituted solution obtained from the absorber. In this refrigeration system however a cooling tower is required for providing cooling water to the absorber and condenser.

WO 2007/110854 describes a vehicle air conditioning system utilizing an absorption compressor designed to work in parallel with a conventional mechanical compressor, wherein heat energy from the vehicle exhaust gas is used by the air conditioning system as a heat source. The absorption cycle in this international application is very simple providing compression cycle mode or simple absorption sub cycle functioning in place of the compressor, while the rest part of the refrigerant sub cycle remain the same. In addition, nor the absorption system or the compression cycle in this air conditioning system is used for heating the vehicle.

The methods described above have not yet provided satisfactory air cooled absorption cooling systems operated by low grade heat.

It is therefore an object of the present invention to provide systems and methods for absorption cooling that can be efficiently operated employing air as a cooling medium.

It is another object of the present invention to provide systems and methods for absorption cooling that can be efficiently operated utilizing low grade heat sources.

Other objects and advantages of the invention will become apparent as the description proceeds.

SUMMARY OF THE INVENTION

A broad aspect of some embodiments of the invention relates to providing air-cooled absorption refrigeration systems which generation process is capable of being operated by means of alternative or renewable heat sources (e.g., solar energy, industrial processes exhaust heat, or the like) at relatively low temperatures (e.g., up to 130° C.) for cooling and refrigeration by means of single-stage triple pressure level (TPL) absorption. Elements of the absorption systems of the present invention are preferably cooled by ambient air streams, and the system may be divided into high-pressure, intermediate-pressure and low-pressure, regimes.

The TPL absorption cycle preferably comprises refrigerant and solution sub-cycles, wherein the low-pressure regime resides in the refrigerant sub-cycle, the intermediate-pressure regime resides in the solution sub-cycle, and the high-pressure regime partly resides in both sub-cycles. Separator means may be employed in the solution sub-cycle for separating evaporated refrigerant obtained in the generation process and for introducing the separated refrigerant into the refrigerant sub-cycle.

In some embodiments of the invention low-pressure refrigerant from the refrigerant sub-cycle is introduced into the solution sub-cycle by means of a mixing device, such as for example a mixer ejector, preferably by a type of jet ejector mixer, capable of producing a mixture of the low-pressure refrigerant with a stream of high-pressure weak solution introduced to it. Alternatively or additionally, a compressor may used to compress the low-pressure refrigerant before mixing it with the intermediate-pressure weak solution, and in such embodiments a simple mixer unit may be utilized for mixing the compressed refrigerant and the intermediate-pressure weak solution.

A broad aspect of some embodiments of the present invention relates to improving the refrigerant generation process by a heat exchange process in the high-pressure regime in which heat from the weak solution returned from the generation process is transferred to a stream of air-cooled rich solution pumped from the absorption process. Accordingly, in some exemplary embodiments of the invention a solution heat exchanger is utilized in the high-pressure regime for transferring heat from the weak solution returned from the generation process to an air-cooled stream of rich solution pumped thereinto from an absorption process, prior to it being subject to the generation process.

A broad aspect of some embodiments of the invention relates to improving generation efficiency by means of separator means in the high-pressure sub-cycle for separating evaporated refrigerant from the rich solution streamed from the heat exchange process, and for introducing the separated refrigerant into the refrigerant sub-cycle. The residual rich solution, remaining after the evaporated refrigerant was separated, is preferably flown to the refrigerant generation process for evaporating more refrigerant from it.

A broad aspect of some embodiments of the invention relates to improving generation efficiency by splitting the heat exchange process during which heat is transferred to the air-cooled rich solution pumped from the absorption process such that part of the heat exchange process in carried out in the high-pressure regime, and another part of the heat exchange process is carried out partly in the intermediate-pressure regime. In these preferred embodiments of the invention a first heat exchange stage (e.g., pre-absorber heat exchanger— pA) is employed for transferring heat from the mixture of refrigerant and weak solution obtained by the mixing device in the intermediate-pressure regime to the air-cooled high-pressure rich solution pumped from the absorbing process, and a second heat exchange stage (pre-generator heat exchanger—pG) is employed in the high-pressure regime for transferring heat from the weak solution returned from the generation process to the high-pressure rich solution streamed from the first heat exchange stage, prior to it being introduced to the generation process.

A broad aspect of some embodiments of the invention relates to improving generation efficiency by means of separator means in the solution sub-cycle between the first and second heat exchange stages for separating evaporated refrigerant from the high-pressure rich solution streamed from the first heat exchange stage and for introducing the separated refrigerant into the refrigerant sub-cycle. The residual rich solution, remaining after the evaporated refrigerant was separated, is preferably flown to the second heat exchange stage for evaporating more refrigerant from it.

Accordingly, in some preferred embodiments of the invention the generation process may be split into three stages: i) evaporating refrigerant from the high pressure strong solution pumped from the air-cooled absorber means by means of first heat exchanger means in heat exchange relationship with the mixed stream from the mixer means, separating the evaporated refrigerant solution and merging it into a main evaporated refrigerant stream; ii) evaporating refrigerant from a residual stream of high pressure strong solution obtained from the separating by means of a second heat exchanger means in heat exchange relationship with hot stream of weak refrigerant solution, further separating the evaporated refrigerant solution and merging it into the main evaporated refrigerant stream; and iii) evaporating refrigerant from a residual stream of high pressure strong solution obtained form the further separating by means of third heat exchanger means in heat exchange relationship with a stream of heat transfer fluid or gas (e.g., supplied using a low grade heat source), yet further separating the evaporated refrigerant solution and merging it into the main evaporated refrigerant stream and using the residual solution as the hot stream of weak refrigerant solution supplied to the second heat exchanger means.

A broad aspect of some embodiments of the present invention relates to improving the evaporation efficiency by means of a heat exchange process in the refrigerant sub-cycle in which a stream of condensed high-pressure refrigerant is cooled by a stream of low-pressure evaporated refrigerant obtained in the evaporation process.

The term rich solution used herein refers to a refrigerant solution having relatively high levels of absorbed refrigerant by the absorbent, and the term weak solution used herein refers to a refrigerant solution having relatively low-levels of absorbed refrigerant by the absorbent. The term pressure regime used herein refers to zones or sections in the refrigerant circuit (i.e., in the refrigerant and the solution sub-cycles) having pressure conditions which can be distinctively characterized relative to those in the other zones or sections.

In an exemplary embodiment of the invention an air-cooled absorption refrigerating system is provided which comprises generator means in heat exchange relationship with a stream of heat transfer fluid or gas for generating a refrigerant vapor from a high-pressure rich refrigerant solution stream, separator means to separate said high-pressure refrigerant solution into a weak solution stream and a stream of said refrigerant vapor, air-cooled condenser means to form a condensed refrigerant stream from said stream of refrigerant vapor, cooler means in heat exchange relationship with a low-pressure evaporated refrigerant stream to form a cooled condensed refrigerant stream from said condensed refrigerant stream, an expansion valve to form a cooled low-pressure condensed refrigerant stream, and optionally a small amount of refrigerant vapor stream, from said cooled condensed refrigerant stream, evaporator means to form said low-pressure evaporated refrigerant stream from said cooled low-pressure condensed refrigerant stream and for cooling a surrounding material (e.g., indoor air in a refrigerated space), heater means in heat exchange relationship with said weak solution stream to form said high-pressure rich refrigerant solution stream, pressure reducer means to form an intermediate-pressure weak solution stream from a stream of weak solution obtained from said heat exchanging means, mixer means for producing a mixed stream comprising a mixture of said intermediate-pressure weak solution stream and said intermediate-pressure evaporated refrigerant stream, air-cooled absorber means for receiving said mixed stream and producing an air-cooled rich refrigerant solution, and pump means for producing said air-cooled high-pressure rich solution stream.

According to one aspect the present invention is directed to an air-cooled absorption refrigerating system comprising: generator means in heat exchange relationship with a stream of heat transfer fluid or gas (e.g., type of low grade heat source), separator means adapted to separate a stream from the generator means into a weak refrigerant solution stream and a main refrigerant vapor stream, air-cooled condenser means to condense the main refrigerant vapor stream, an expansion valve to reduce the pressure of a condensed refrigerant stream from the air-cooled compressor means, evaporator means to form a stream of evaporated refrigerant from a stream from the expansion valve and to cool a surrounding material, a main heat exchanger means to exchange heat between the weak refrigerant solution stream and a high-pressure rich refrigerant solution stream, mixer means (e.g., jet ejector mixer) to produce a mixed stream from the stream of evaporated refrigerant from the evaporator means and from a stream of weak solution from the heat exchanger means, air-cooled absorber means to reconstitute the mixed stream, and pump means to produce the high-pressure rich refrigerant solution stream from a stream from the air-cooled absorber means.

Advantageously, the system may further comprise an additional heat exchanger means to exchange heat between the stream of condensed refrigerant from the air-cooled condenser means and the stream of evaporated refrigerant from the evaporator means, which the conducted therefrom to the mixer means for mixing with the weak solution.

The system may further comprise separator means to separate a stream of rich refrigerant solution from the main heat exchanger means into an additional refrigerant vapor stream, introduced into the main refrigerant vapor stream, and a residual solution, introduced into the generator means.

Preferably, the main heat exchanger means is split into first and second heat exchange stages: i) a first heat exchange stage to exchange heat between the weak refrigerant solution stream and a stream of high-pressure rich solution from the second heat exchange stage; and ii) a second heat exchange stage to exchange heat between a mixed stream from the mixer means and the high-pressure rich solution stream, wherein the air-cooled absorber means is adapted to reconstitute a mixed stream obtained from the second stage heat exchange means.

The system may further comprise separator means to separate the stream of rich refrigerant solution from the second stage heat exchange means into a further refrigerant vapor stream, introduced into the main refrigerant vapor stream, and a residual solution introduced into the first stage heat exchange means.

The system may further comprise pre-cooler means to cool the main refrigerant vapor stream provided to the air-cooled condenser means to a temperature near its saturation temperature.

The system may further comprise pressure reducer means adapted to reduce the pressure of the stream of weak refrigerant solution provided to the mixer device from the first heat exchange stage.

The system may further comprise main compressor means to compress a stream of evaporated refrigerant obtained from the additional heat exchanger means and introduce the same into the mixer means. Optionally, the system may comprise additional compressor means, or multistage compressor means, adapted to compress a stream of compressed refrigerant from the main compressor means and introduce the same into the air-cooled condenser means. Advantageously, the system may further comprise two three-way valves and ductwork adapted to change the system between two operating states: i) wherein a stream of compressed evaporator from the main compressor means is directed into the mixer means and the main stream of refrigerant vapor is directed into the air-cooled condenser means; and ii) wherein a stream of compressed vapor from the main compressor means is directed into the additional compressor means, a stream of compressed refrigerant from the additional compressor means is directed into the air-cooled condenser means, and the main stream of refrigerant vapor is precluded from reaching the air-cooled condenser means.

Optionally, the system may further comprise additional valves and conduits adapted to changes the mode of operation of the system between two states: a heating mode wherein the compressed refrigerant stream from the additional compressor means, or multistage compressor means, is conducted into the evaporator means, a stream of evaporated refrigerant from the evaporator means is conducted into a first inlet of the additional heat exchange means, a stream of condensed refrigerant from the air-cooled condenser means is conducted into a second inlet of the additional heat exchange means which is then conducted therefrom into the main compressor means; and a cooling mode wherein the compressed refrigerant stream from the additional compressor means, or multistage compressor means, is conducted into the air-cooled condenser means, a stream of condensed refrigerant from the air-cooled condenser means is conducted into the first inlet of the additional heat exchange means, a stream of evaporated refrigerant from the evaporator means is conducted into the second inlet of the additional heat exchange means which is then conducted therefrom into the main compressor means.

Control means (e.g., PLC) may used to change the states of the three-way valves and/or of the additional valves to change the state of the system between the operating states and/or between the modes of operations, and to operate the compressing means as needed.

According to another aspect the present invention is directed to a method for cooling a refrigerated space comprising: mixing a stream of evaporated refrigerant with a stream of weak refrigerant solution; producing a reconstituted solution by absorbing portions of the evaporated refrigerant into the stream of weak refrigerant by means of air-cooled absorber means; pumping the reconstituted solution into heater means being in heat exchange relationship with the stream of weak refrigerant solution and conducting the weak refrigerant solution therefrom for use in the mixing; evaporating refrigerant from a stream of reconstituted solution from the heater means by means of generator means being in heat exchange relationship with a stream of heat transfer fluid or gas; separating a stream from the generator means into the (residual) stream of hot weak refrigerant solution and a main refrigerant vapor stream; condensing the main refrigerant vapor stream by means of air-cooled condenser means; conducting the condensed refrigerant vapor stream from the air-cooled condenser means into cooler means being in heat exchange relationship with a stream of cold evaporated refrigerant and conducting the stream of evaporated refrigerant therefrom for use in the mixing; reducing the pressure of a stream of condensed refrigerant from the cooler means and conducting the same into evaporator means; and evaporating the condensed refrigerant in the evaporator means to form the stream of evaporated refrigerant and to cool the refrigerated space.

The method may further comprise separating a stream of reconstituted solution from the heater means into an additional refrigerant vapor stream and conducting it into the main refrigerant vapor stream, and conducting a remaining (residual) stream of reconstituted solution into the generator means.

The heater means may be split into first and second heat exchange stages: i) a first heat exchange stage used for exchanging heat between the weak refrigerant solution stream and a stream of reconstituted solution from the second heat exchange stage; and ii) a second heat exchange stage to exchange heat between a mixed stream obtained in the mixing and the reconstituted solution stream, wherein the absorbing in the air-cooled absorber means comprise reconstituting a mixed stream obtained from the second stage heat exchange means.

The method may further comprise separating a stream of reconstituted solution from the second heat exchange stage into a further refrigerant vapor stream and conducting it into the main refrigerant vapor stream, and conducting a remaining (residual) stream of reconstituted solution into the first heat exchange stage.

The method may further comprise cooling the main refrigerant vapor stream provided to the air-cooled condenser means to a temperature near its saturation temperature.

The method may further comprise reducing the pressure of the stream of weak refrigerant solution provided to the mixing from the first heat exchange stage.

Optionally, the method may further comprise compressing a stream of evaporated refrigerant obtained from the cooler means and using it in the mixing. Optionally, the stream of compressed refrigerant may be conducted into the air-cooled condenser means for condensing.

Alternatively, the stream of compressed refrigerant may be arbitrated between two operation states: i) wherein the stream of compressed refrigerant is used in the mixing; or ii) wherein the stream of compressed refrigerant is used for the condensing. The method may further comprise changing the mode of operation between two states: a heating mode comprising conducting the stream of compressed refrigerant stream into the evaporator means, conducting a stream of evaporated refrigerant from the evaporator means into a first inlet of the cooler means, conducting a stream of condensed refrigerant from the air-cooled condenser means into a second inlet of the cooler means and conducting it therefrom for the compressing; and a cooling mode comprising conducting the compressed refrigerant stream into the air-cooled condenser means, conducting a stream of condensed refrigerant from the air-cooled condenser means into the first inlet of the cooler means, conducting a stream of evaporated refrigerant from the evaporator means into the second inlet of the cooler means and conducting it therefrom for the compressing.

The refrigerant solution may comprise an absorbent material based on one or more of the following phosphates: trimethylphosphate $C_3H_9PO_4$; triethylphosphate $C_6H_{15}PO_4$; tri n-butylphosphate $C_{12}H_{27}PO_4$, on a phosphonate material: Dimethylmethylphosphonate $C_3H_9PO_3$, on one or more of the following Ethylene glycol materials: Ethylene glycol $C_2H_6O_2$; Dimethylether of tetraethyleneglycol $C_{10}H_{22}O_5$; 1,3-propanediol(trimethylene glycol) $C_3H_8O_2$, and/or based on one or more N—C═O bonds selected forms: N,N dimethylacetamid $C_4H_9NO$; N-methyl,2-pyrrolidinone(methyl-2-pyrrolidone,M-pyrrol) $C_5H_9NO$; N-methyl; e-caprolactam (hexahydro,1-methyl,2H-azepin 2-one) $C_7H_{13}NO$; 1,3-dimethyl,2-imidazolidinone(dimethylethyleneurea) $C_5H_{10}N_2O$; 1,3-dimethyl,3,4,5,6-tetrahydro-2-pyrimidinone (dimethylpropyleneurea) $C_6H_{12}N_2O$).

The refrigerant material used may be a type of HFC, HFC refrigerants (R32—difluoromethane $CH_2F_2$, R152a—1,1 difluoroethane $CH_3CHF_2$, R134a—1,1,1,2 tetrafluoroethane $CH_2FCF_3$, R125—pentafluoroethane $CF_3CHF_2$, R226ea—1, 1,1,2,3,3 hexafluoropropane $CF_3CHFCHF_2$, R226fa—1,1,1, 3,3,3 heptafluoropropane $CF_3CH_2CF_3$, R227ea—1,1,1,2,3, 3,3 heptafluoropropane $CF_3CHFCF_3$), R600a (iso-butane $(CH_3)_3CH$), or R630 (monomethylamine $CH_3NH_2$, —dimethylamine$(CH_3)_2NH$), for example.

BRIEF DESCRIPTION OF THE DRAWINGS

The present invention is illustrated by way of example in the accompanying drawings, in which similar references consistently indicate similar elements and in which.

DETAILED DESCRIPTION OF PREFERRED EMBODIMENTS

It is noted that the preferred embodiments of the invention described hereinbelow with reference to the figures illustrate by way of example, and not by way of limitation, the principles of the invention. The figures, which are not necessarily in scale, exemplify preferred embodiments of the invention, and by no means limit the invention to the particular elements described.

An aim of the present invention is to facilitate exploitation of alternative or renewable heat sources at relatively low temperatures, preferably up to 130° C. for cooling and refrigeration by means of single-stage triple pressure level (TPL) absorption, which may be operated without a cooling tower. The TPL absorption unit of the invention may be adapted to operate an air conditioning system employing a heat source such as solar energy.

Among various heat sources, the range of low grade temperature sources (e.g., providing temperatures in the range of 80 to 130° C.) such as solar energy, waste heat energy, and the like, is an important and difficult range for utilization and recovery. The utilization of such low grade heat sources is particularly desirous since it leads to elimination of greenhouse and air polluted gases and utilization of environmentally safe energy sources.

In preliminary studies carried out by the inventors, thermophysical and transport properties of various environmentally acceptable refrigerants (HFC) with different organic absorbents were examined and a thorough performance analysis of TPL cycles has been performed, in order to evaluate the potential performance of the cycle with these working fluids (possible refrigerant and absorbent materials indicated hereinbelow).

An important objective of the present invention, inter alia, is utilizing renewable energy for cooling without utilizing a cooling tower. The significance of this work lies in the potential to provide air conditioning (heating and cooling) and refrigeration by utilizing low grade heat sources, mainly solar radiation and waste heat energy.

Triple Pressure Level Single Stage Absorption Cycle

Figure 1:
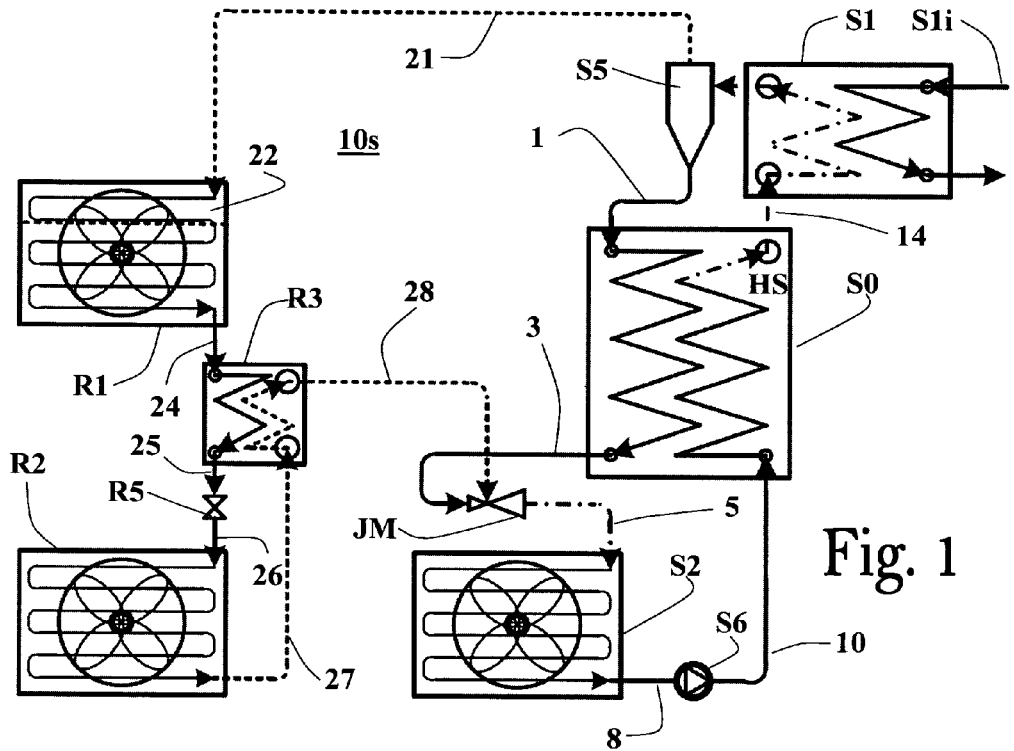
FIG. 1 schematically illustrates a TPL single-stage cycle air cooled system according to one preferred embodiment of the invention utilizing a jet ejector mixer and a solution heat exchanger economizer (HS) at the high-pressure regime of the system.

In FIG. 1 there is shown a basic TPL system 10s according to one preferred embodiment of the invention, utilizing jet ejector mixer JM and a solution heat exchanger S0 (HS) mounted between generator S1 and air-cooled absorber S2. Heat exchanger unit S0 functions as an economizer by transferring heat from the hot weak solution leaving generator S1 through separator S5 (passed via pipelines 1 and 3) to the cold reconstituted solution pumped by pump S6 (via pipelines 8, 10 and 14) towards generator unit S1. The rich solution is heated in the generator unit S1 by means of a heat transfer gas or fluid conducted thereinto via inlet S1i or any other form of heat supplied, and having temperatures generally in the range of 90 to 140° C., preferably about 120° C.

The rich solution is separated in separator unit S5 into: i) a stream of refrigerant conducted through pipeline 21 to air-cooled condenser unit R1; and ii) a weak solution stream conducted through pipeline 1 to heat exchanger S0. The weak solution leaving heat exchanger S0 is conducted through pipeline 3 into jet ejector mixer JM wherein it is mixed with the refrigerant conducted into jet ejector mixer JM through pipeline 28. The mixed solution and refrigerant vapor are conducted through pipeline 5 into air-cooled absorber unit S2 wherein it is cooled (e.g., to about 30-50° C.) to produce the rich (reconstructed) solution conducted to pump S6 through pipeline 8.

The stream of refrigerant is condensed in air-cooled condenser unit R1 (e.g., to about 30-50° C.) from which it is conducted thorough pipeline 24 into refrigerant heat exchanger R3 and therefrom through pipeline 25 and expansion valve R5 into evaporator R2. The evaporated refrigerant is conducted through pipeline 27 into refrigerant heat exchanger R3 and therefrom through pipeline 28 into jet ejector mixer JM.

The pressure regimes in system 10s may be defined as follows: High-pressure regime in the strong solution path from pump S6 through pipeline 10, economizer heat exchanger S0, pipeline 14 and generator S1 as it passed into separator unit S5, and therefrom in the weak solution path exiting separator unit S5, passing through pipeline 1 into economizer heat exchanger S0 and therefrom through pipeline 3 to jet ejector mixer JM and in the refrigerant path from separator unit S5 through pipeline 21, air cooled condenser R1, pipeline 24, refrigerant heat exchanger R3 and pipeline 25 to expansion valve R5; intermediate-pressure regime in the mixed solution and refrigerant vapor path exiting jet ejector mixer JM outlet through pipeline 5, air cooled absorber S2, and pipeline 8 into pump S6; and low-pressure regime in the refrigerant path from expansion valve R5 through pipeline 26, evaporator unit R2, pipeline 27, refrigerant heat exchanger R3 and pipeline 28 into jet ejector mixer JM.

A pre-cooler unit 22 may be provided in air-cooled condenser R1 for cooling the hot refrigerant gas supplied through pipeline 21 to a temperature near to its saturation temperature. Pre-cooler unit 22 may be integrated into air-cooled condenser unit R1, or alternatively, it may be provided as a separate unit adapted to receive and cool the hot refrigerant gas supplied through pipeline 21, and conduct it therefrom into air-cooled condenser unit R1.

Figure 2:
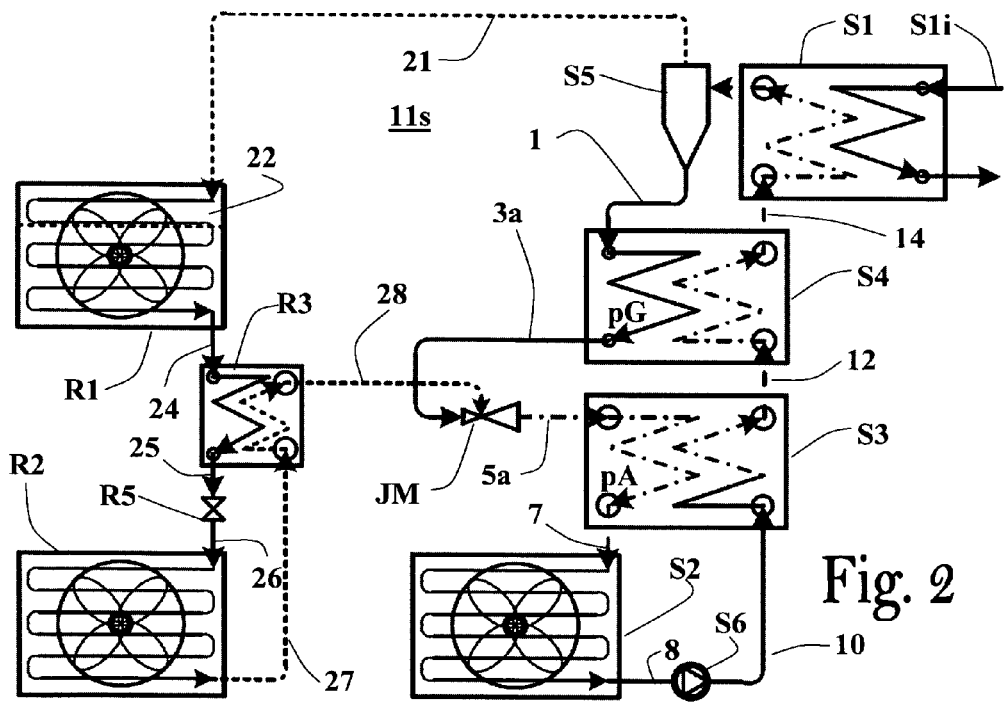
FIG. 2 schematically illustrates a TPL single-stage cycle air cooled system according to another preferred embodiment of the invention utilizing a jet ejector mixer, and a split solution heat exchanger economizer having a pre-generator heat exchanger (pG) in the high-pressure regime and a pre-absorber heat exchanger (pA) in the intermediate-pressure regime.

FIG. 2 exemplifies an embodiment of another TPL system 11s according to another preferred embodiment of the invention wherein the economizer heat exchanger (S0 in FIG. 1) is split into two separate heat exchange stages (also referred to herein as split economizer): pre-generator heat exchanger S4 (pG) at the high-pressure side receiving weak solution leaving separator S5 through pipeline 1 wherefrom it is passed through pipeline 3a to jet ejector mixer JM; and pre-absorber heat exchanger S3 (pA) in the intermediate-pressure side receiving mixed solution leaving jet ejector mixer JM through pipeline 5a toward air cooled absorber S2 through pipeline 7.

The pressurized strong solution produced by pump S6 is conducted through pipeline 10 into pre-absorber heat exchanger S3, and through pipeline 12 into pre-generator heat exchanger S4, wherefrom it is conducted through pipeline 14 into generator S1. Splitting the economizer heat exchanger (S0 in FIG. 1) in this way allows conveying heat from the hot solution leaving jet ejector mixer JM in the intermediate-pressure path of system 11s to the reconstituted solution pumped by pump S6 from absorber S2 and through pipeline 8 into the high-pressure part of system 11s.

Figure 3:
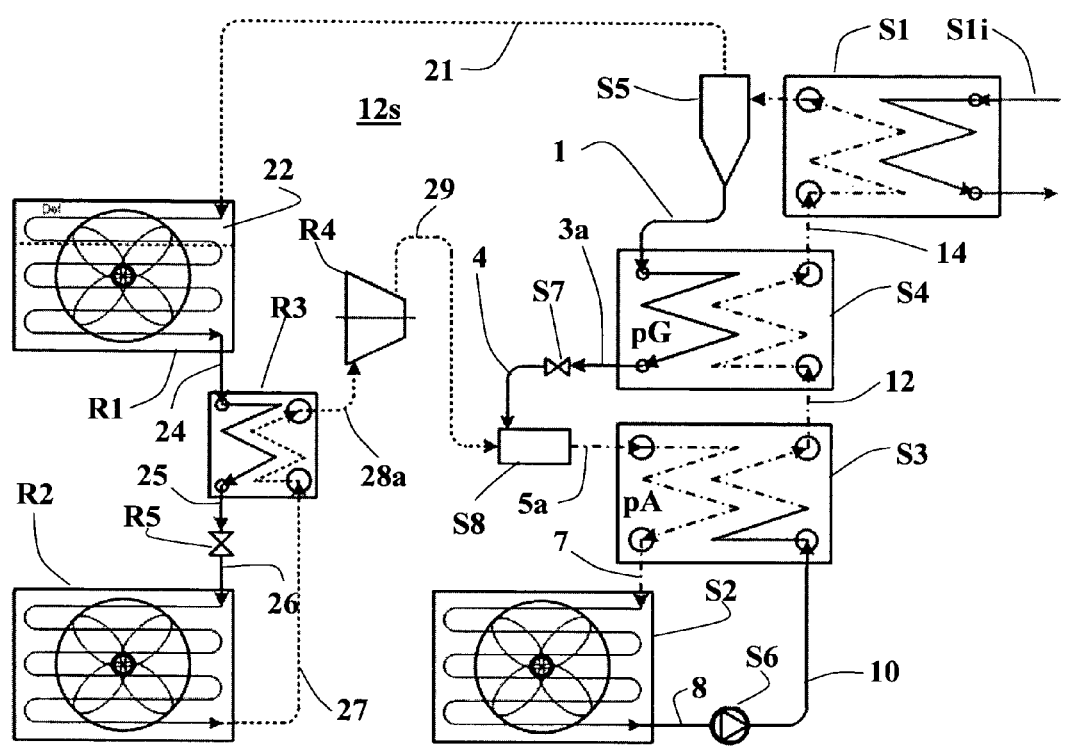
FIG. 3 schematically illustrates a TPL single-stage cycle air cooled system according to yet another preferred embodiment of the invention utilizing a compressor, a mixer, a split solution heat exchanger economizer having a pre-generator heat exchanger (pG) in the high-pressure regime and a pre-absorber heat exchanger (pA) in the intermediate-pressure regime.

The pressure recovery by jet ejector mixer JM is typically limited by the flow conditions and can be substantially improved by replacing jet ejector mixer JM with a common compressor (R4) and/or pressure reducer means (S7) and a mixer unit (S8) as exemplified in TPL system 12s shown in FIG. 3. In this preferred embodiment the evaporated refrigerant passed through refrigerant heat exchanger R3 is conducted through pipeline 28a to compressor R4, wherein it is compressed and flown through pipeline 29 to mixer unit S8. Replacing jet ejector mixer JM with compressor R4, pressure reducer means (S7) and mixer unit S8 in such way enables increasing the pressure in the intermediate-pressure regime (defined by pipelines 29, 4, 5a, 7 and 8) to a higher controlled pressure, and thereby to improve the cycle performances, namely, increasing the COP (coefficient of performance) and decreasing the circulation ratio (mass flow rates of the strong solution to the refrigerant).

In the TPL systems 11s and 12s using a split economizer configuration, shown in FIG. 2 and FIG. 3, the release of refrigerant vapor from the strong solution flown through generator S1 is commenced in the pre-absorber heat exchanger S3 (pA) continuing in pre-generator heat exchanger S4 (pG) and completed in generator S1. During this process the released refrigerant vapor is also heated as it is passed through pre-generator heat exchanger S4 (pG) and generator S1. Thereafter, the separated refrigerant is cooled at condenser unit R1, preferably at the entrance of condenser unit R1 by means pre-cooler unit 22. As explained hereinabove, system 12s in FIG. 3 is similar to system 11s in FIG. 2, and utilizes similar elements but employs compressor unit R4, pressure reducer S7, and a simpler mixer unit S8 instead of jet ejector mixer (JM), and thus it will not be described herein in details for the sake of brevity.

Figure 4:
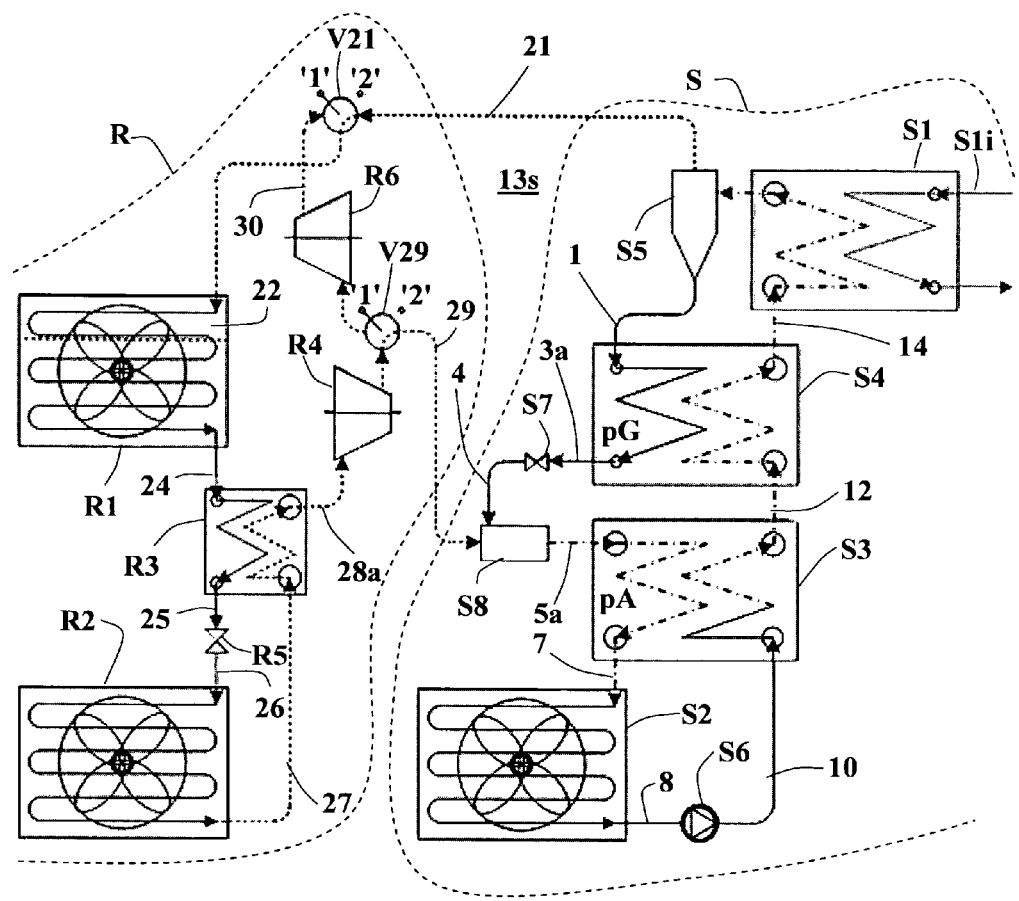
FIG. 4 schematically illustrates a TPL single-stage cycle air cooled system according to yet another preferred embodiment of the invention utilizing a split solution heat exchanger economizer as in FIG. 3 and an optional secondary compressor.

Another preferred embodiment of the invention utilizing the split economizer configuration is exemplified in FIG. 4, showing a TPL single-stage absorption system 13s similar to system 12s shown in FIG. 3, but which employs an (optional) additional compressor unit R6. TPL system 13s comprises the following parts: in the solution sub cycle (S); generator S1, air cooled absorber S2, pre-absorber heat exchanger S3, pre-generator heat exchanger S4, separator S5, solution pump S6, solution pressure reducer S7 (e.g., throttling valve) and mixer unit S8, in the refrigerant sub cycle (R); air cooled condenser R1, evaporator R2, optional refrigerant heat exchanger R3, main compressor R4, expansion valve R5, optional secondary compressor R6, and two separation valves, V21 and V29.

In this preferred embodiment shown in FIG. 4 rich solution flown through the air cooled absorber outlet 8 is pumped from air-cooled absorber S2 into the high-pressure part (defined by pipelines 10, 12 and 14) toward the generator S1 by pump S6 (thorough pipelines 8 and 10) and preheated in the pre-absorber solution heat exchanger S3 by the hot mixed stream coming from the mixer S8 toward absorber S2 (through pipelines 5a and 7), and in the pre-generator heat exchanger S4 by the hot weak solution flown from generator S1 toward mixer S8 (through pipelines 1, 3a and 4). At generator S1 heat is added from available heat source (e.g., solar-heated water, geothermal-heated water, power plant exhaust heat, or any other form of available heat supply) introduced thereinto via heat source inlet S1i, releasing at separator S5 part of the refrigerant that is flown through pipeline 21 to the refrigerant sub-cycle. The weak solution leaves the pre-generator heat exchanger S4 through pipeline 3a and therefrom flown through a pressure reducing device S7 and pipeline 4 into mixer S8, wherein it is mixed with the refrigerant vapors flown from the evaporator R2 through pipeline 27, refrigerant heat exchanger R3 and compressor R4 which increases the pressure of the evaporated refrigerant flown through pipeline 29. The mixed solution and refrigerant vapor flown from mixer unit S8 enters the pre-absorber heat exchanger S3 through pipeline 5a, wherein part of the refrigerant is absorbed by the weak solution which is then passed through pipeline 7 into absorber S2, wherein the rest of the refrigerant is absorbed during the cooling process, which completes the solution sub-cycle S.

From separator S5 the released refrigerant vapor passed through pipeline 21 flows into the air cooled condenser R1, wherein it condenses. The liquefied refrigerant leaving condenser R1 through pipeline 24 flows through the refrigerant heat exchanger R3, wherein it is cooled by the cold refrigerant vapor leaving evaporator R2 through pipeline 27, and therefrom it is passed through pipeline 25 to expansion valve R5 and therefrom through pipeline 26 into evaporator R2. The refrigerant vapors obtained in evaporator R2 are flown through pipeline 27 to refrigerant heat exchanger R3, and therefrom through pipeline 28a to compressor R4 which increases the pressure of the evaporated refrigerant to the intermediate elevated pressure. The compressed evaporated refrigerant produced by compressor R4 is flown through pipeline 29 toward mixer S8, which completes the refrigerant sub-cycle R.

Generator S1, pre-absorber heat exchanger S3, pre-generator heat exchanger S4, and optional refrigerant heat exchanger R3, may be implemented by means of conventional heat exchangers, such as but not limited to shell and tube types. Absorber S2, condenser R1, and evaporator R2 are preferably implemented by means of air-cooled units, such as but not limited to the types of air-cooled units used in standard air-conditioning heat exchangers.

Separator S5 may be implemented by a type of cyclone, or any other such separator means. Solution pump S6 may be implemented by a type of multistage centrifugal, positive displacement, for example, or by another type of pump. Solution pressure reducer S7 may be implemented by a type of pressure regulator, orifice, for example, or by another suitable type of pressure regulation means. Mixer S8 may be implemented by a type of spray nozzle, for example. Compressors R4 and R6 are preferably a type of screw, reciprocate, for example, or another suitable type of compressing means. Expansion valve R5 may be implemented by a type of thermostatic expansion valve, capillary tubes or other type. Separation valves, V21 and V29 are preferably implemented by a type of controllable three-way valve or by any other suitable controllable valve type. Pre-cooler unit 22 is preferably, but not necessarily, a part of the entrance of condenser R1.

The absorbent used may be based on phosphate(trimethylphosphate $C_3H_9PO_4$, triethylphosphate $C_6H_{15}PO_4$, tri n-butylphosphate $C_{12}H_{27}PO_4$, and others), on phosphonate (Dimethylmethylphosphonate $C_3H_9PO_3$, and others), on Ethylene glycol (Ethylene glycol $C_2H_9O_2$, Dimethylether of tetraethyleneglycol $C_{10}H_{22}O_5$, 1,3-propanediol(trimethylene glycol) $C_3H_8O_2$, and others), or on N—C=O bonds (N,N dimethylacetamid $C_4H_9NO$, N-methyl,2-pyrrolidinone(methyl-2-pyrrolidone,M-pyrrol) $C_5H_9NO$, N-methyl, e-caprolactam(hexahydro,1-methyl,2H-azepin 2-one) $C_7H_{13}NO$, 1,3-dimethyl,2-imidazolidinone(dimethylethyleneurea) $C_5H_{10}N_2O$, 1,3-dimethyl, 3,4,5,6-tetrahydro-2-pyrimidinone(dimethylpropyleneurea) $C_6H_{12}N_2O$), for example, though other suitable absorbents may be similarly employed.

The refrigerant used may be a type of HFC, HFC refrigerants (R32—difluoromethane $CH_2F_2$, R152a—1,1 difluoroethane $CH_3CHF_2$, R134a—1,1,1,2 tetrafluoroethane $CH_2FCF_3$, R125—pentafluoroethane $CF_3CHF_2$, R226ea—1,1,1,2,3,3 hexafluoropropane $CF_3CHFCHF_2$, R226fa—1,1,1,3,3,3 heptafluoropropane $CF_3CH_2CF_3$, R227ea—1,1,1,2,3,3 heptafluoropropane $CF_3CHFCF_3$), R600a (iso-butane $(CH_3)_3CH$), or R630 (monomethylamine $CH_3NH_2$, —dimethylamine$(CH_3)_2NH$), for example, though other suitable refrigerants may be similarly employed.

All of the abovementioned parameters are given by way of example only, and may be changed in accordance with the differing requirements of the various embodiments of the present invention. Thus, the abovementioned parameters should not be construed as limiting the scope of the present invention in any way.

It is noted that in case the heat is not capable of supplying (via inlet S1i or any other form of heat supplied) the amount of heat required for the operation of generator S1, the preferred embodiments of the invention may be modified for introducing an auxiliary heat source supply by heaters (not shown), such as for example, electrical heater, gas heater, heat storage, or any other such heat source.

Whenever the low energy heat source provided via heat input S1i (or any other form of heat supplied) is not available (e.g., if implemented by an intermittent heat source such as solar heat), a vapor compression cycle with similar cooling capacity can be operated by activating the secondary compressor R6 that is utilized for increasing the refrigerant pressure from the intermediate-pressure to the condenser pressure (in pipeline 30). In this case, the solution sub cycle S is separated from the refrigerant sub cycle R by valves V21 and V29 by changing them into state '2'. It is noted that this separated refrigerant cycle can also be operated as a heat pump.

The serially connected compressors, R4 and R6, can be replaced by any suitable compressor (or set of compressors) which output pressure can be controlled (i.e. frequency control means).

Figure 5:
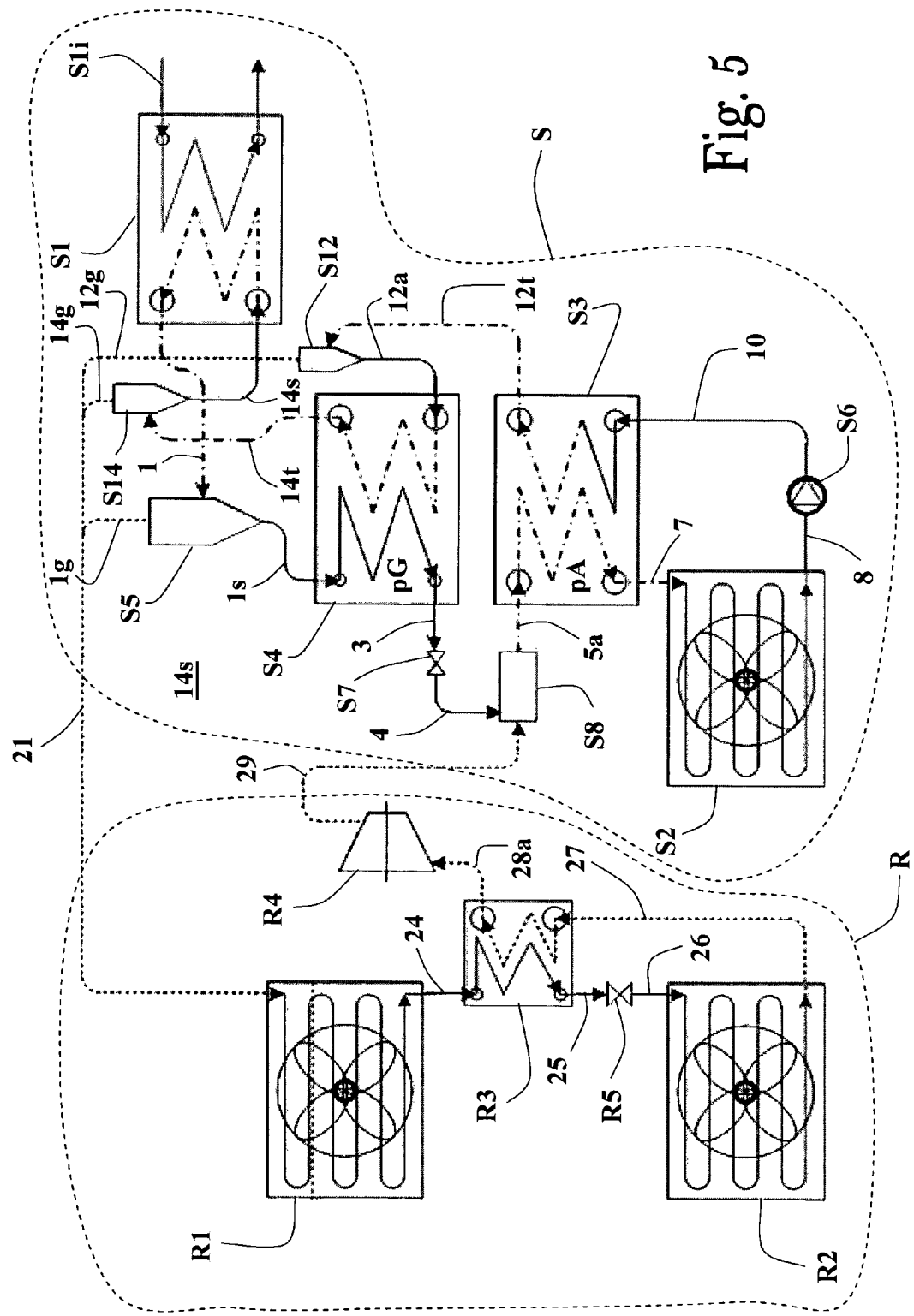
FIG. 5 schematically illustrates a TPL single-stage cycle air cooled system according to yet another preferred embodiment of the invention utilizing a split solution heat exchanger economizer as in FIG. 3, a compressor, and two additional separator, means.

As exemplified in system 14s shown in FIG. 5, illustrating a yet another preferred embodiment of the invention, similar to system 12s in FIG. 3, in which separator S12 is added at the outlet of pre-absorber heat exchanger S3, and another separator S14 is added at the outlet of pre-generator heat exchanger S4, in order to partially overcome the heating of the refrigerant vapors in the high-pressure part.

In this preferred embodiment the reconstituted solution flown from pre-absorber heat exchanger S3 through pipeline 12t is supplied to pre-generator heat exchanger S4 through pipeline 12a after passing through separator S12 which streams portions of the refrigerant vapor separated by it to pipeline 21 through pipeline 12g. Similarly, the reconstituted solution flown from pre-generator heat exchanger S4 through pipeline 14t is supplied to generator S1 through pipeline 14s after passing through separator S14, which streams portions of the refrigerant vapors separated by it to pipeline 21 through pipeline 14g. As in the previously described embodiments, the reconstituted solution flown from generator S1 is provided to separator S5 via pipeline 1, and the separated refrigerant vapor is flown to pipeline 21 through pipeline 1g. In this way the pre-generator heat exchanger S4 (pG) and the generator S1 are receiving mainly liquid solution at their inlets and consequently less heat has to be supplied to these units. As a consequence, the required components sizes are reduced, less heat has to be supplied to the generator and the COP is increased. The refrigerant vapors from separators S12 and S14 are mixed with the refrigerant vapor from the generator separator S5 and flow toward condenser R1 through pipeline 21.

The main driving force of the absorption systems of the invention is the heat supplied to generator S1 (via inlet S1i). If this heat energy is obtained from a solar energy source the functionality of the system depends on the availability of the heat source. That dependency can be resolved by adding a heat storage unit (not shown) or by utilizing the semi-compression cycle in the system between pipelines 21 and 29, by adding a second compressor R6 and two valves, V21 and V29, installed in pipelines 21 and 29 respectively, in order to complete a compression cycle, as shown in the preferred embodiments of FIGS. 4 and 6.

Figure 6:
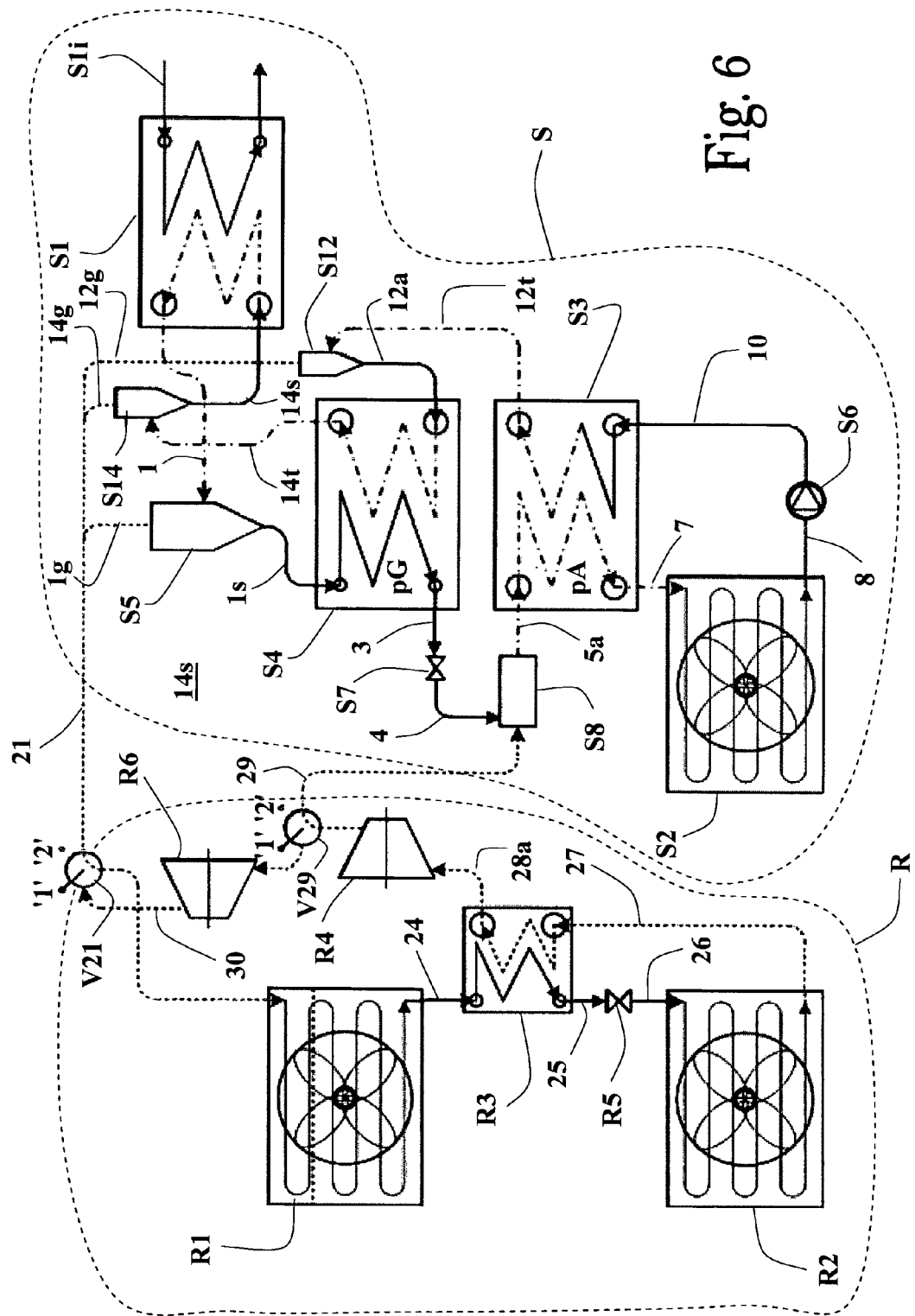
FIG. 6 schematically illustrates a TPL single-stage cycle air cooled system according to yet another preferred embodiment of the invention utilizing a split solution heat exchanger economizer as in FIG. 5, and a secondary compressor.

With reference to FIG. 6, in this preferred embodiment at normal operating conditions valves V21 and V29 are in state '1' in order to enable the refrigerant vapor from the separators S5, S12 and S14 flown through pipeline 21 to flow toward condenser R1 and from compressor R4 through pipeline 29 toward mixer S8. When the solar energy cannot supply sufficient heat, valves V21 and V29 are turned to state '2', disconnecting the absorption sub cycle (S) and connecting secondary compressor R6 to the compressor R4 in series in order to complete a compression cycle with the same evaporator capacity. This is an on-off arrangement.

For example, when the solar energy source can supply only part of the necessary heat to generator S1, the heat source temperature can be kept stable by lowering the flow rate; as a result there will be a reduction in the amount of refrigerant vapor released in generator S1. To keep the amount of refrigerant vapor streamed toward condenser R1 stable, replacing valves V21 and V29 to controllable valves is advantageous. By that replacement, continuous operation of the secondary compressor R6 is employed in order to add the completion amount of refrigerant vapor to be mixed with the refrigerant vapor coming from generator S1. In this way the two sub cycles (S and R) can operate continuously to maintain constant evaporator capacity. Whenever the solar energy is not sufficient, valves V21 and V29 will be turned to state '2' and the cycle will operate as a compression cycle.

When the heat supply is not available and the cycle turned to operate as a compression cycle (state '2'—the absorption sub cycle S is disconnected), and yet there is heating demands, the cycle described with reference to FIG. 6 can be modified to operate as a heat pump, as exemplified in FIGS. 7A-7C, by adding valves V24, V26 and V27 to the compression sub cycle (R) and additional ductwork to enable the cycle to operate in two modes: i) cooling, also illustrated in FIG. 7B; or ii) heating, also illustrated in FIG. 7C.

Valve V26 is installed in both pipelines 21 and 26 and adapted to arbitrate the flow through these pipelines between two states: '1' (illustrated in FIG. 7B)—refrigerant flown through pipeline 21 is conducted through pipeline 21a to air-cooled condenser unit R1, and the refrigerant flown through pipeline 26 is conducted through pipeline 26a to evaporator R2; and '2' (illustrated in FIG. 7C)—wherein refrigerant flow through pipeline 21 is conducted through pipeline 26a to evaporator R2, and the refrigerant flown through pipeline 26 is conducted through pipeline 21a to air-cooled condenser unit R1.

Valves V24 and V27 are installed in both pipelines 24 and 27 and adapted to arbitrate the flow through these pipelines between two states: '1' (illustrated in FIG. 7B)—refrigerant flown through pipeline 24 is conducted through pipeline 24a to first inlet i1 of refrigerant heat exchanger R3, and the refrigerant flown through pipeline 27 is conducted through pipeline 27a to second inlet i2 of refrigerant heat exchanger R3; and '2' (illustrated in FIG. 7C)—wherein refrigerant flow through pipeline 24 is conducted through pipelines 24b and 27a to second inlet i2 of refrigerant heat exchanger R3, and the refrigerant flown through pipeline 27 is conducted through pipelines 27b and 24a to first inlet i1 of refrigerant heat exchanger R3.

Figure 7A:
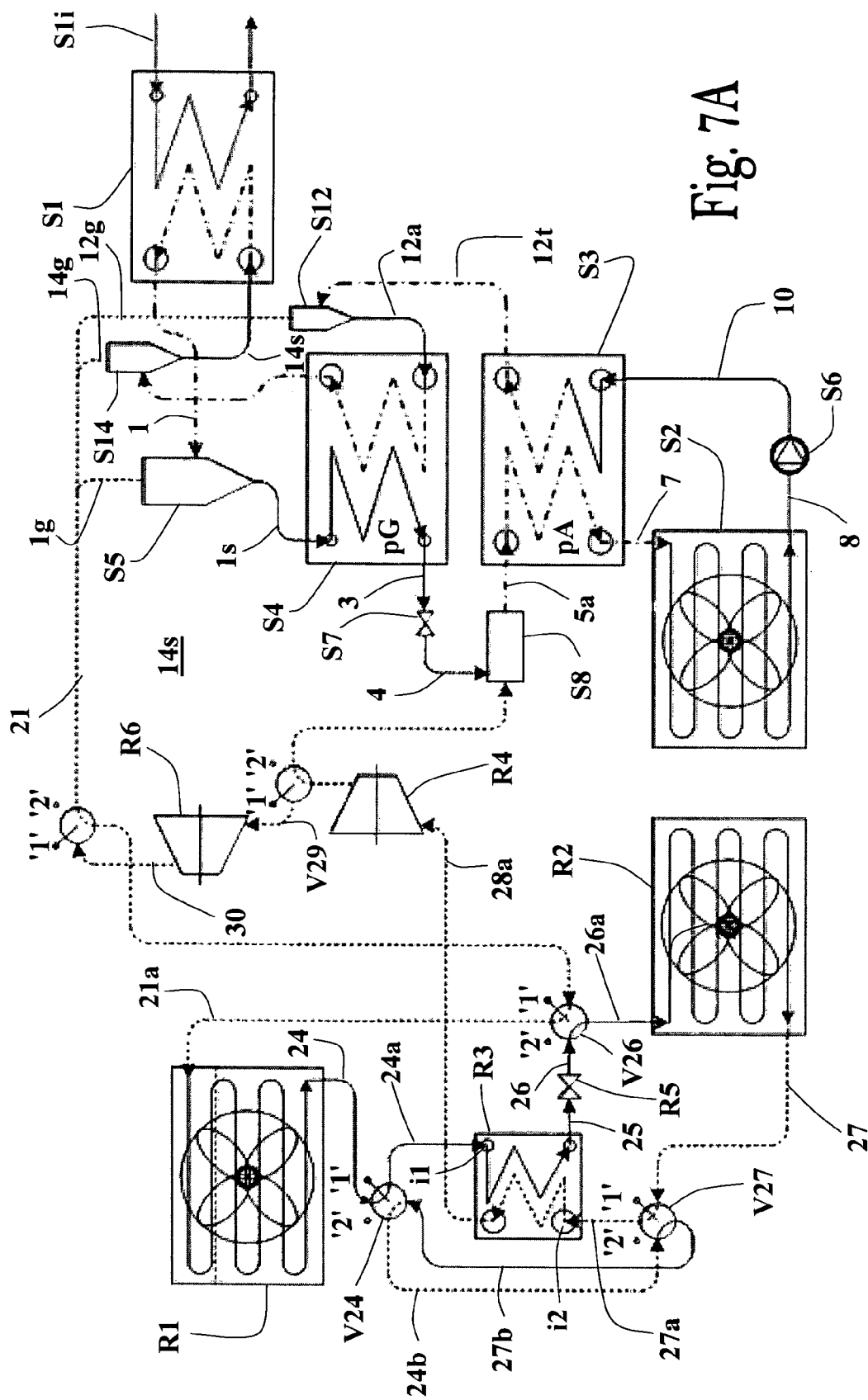
FIG. 7A schematically illustrates a TPL single-stage cycle air cooled system according to yet another preferred embodiment of the invention utilizing a split solution heat exchanger economizer, additional separators and secondary compressor as in FIG. 6, with further means enabling it to operate as a heat pump (cooling and heating)
Figures 7B, 7C:
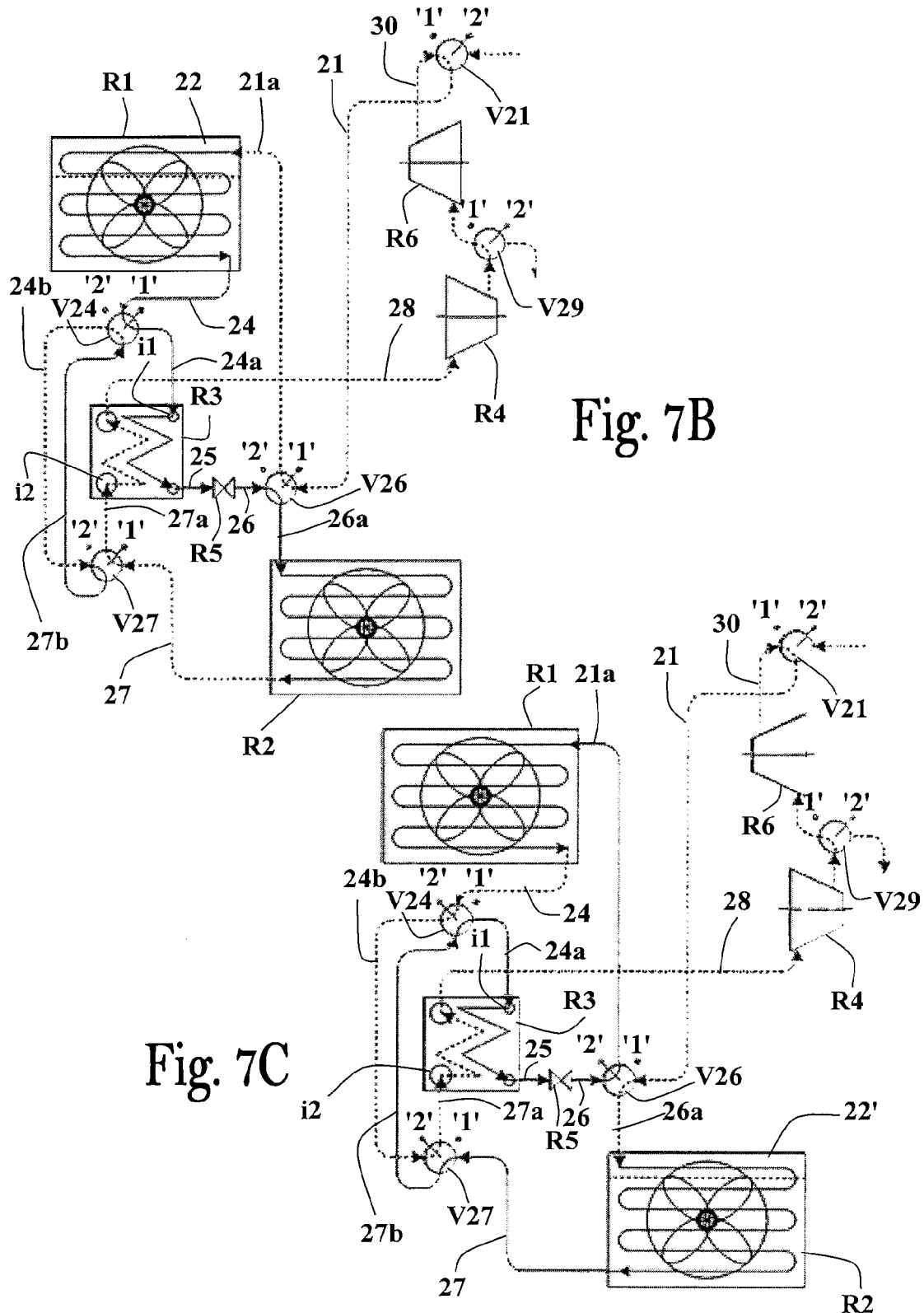
FIGS. 7B and 7C schematically illustrates the refrigerant sub cycle in the TPL single-stage cycle air cooled system shown in FIG. 7A when operated in "cooling mode" (FIG. 7B) and in "heating mode" (FIG. 7C).

In this way, whenever valves V24, V26 and V27 are set into state '1' (i.e., compressed refrigerant is flown from compressors R4 and R6 to air-cooled condenser unit R1 and therefrom through refrigerant heat exchanger R3 to evaporator R2) the compression sub cycle R is operated in the cooling mode (FIG. 7B), and whenever valves V24, V26 and V27 are set into state '2' (i.e., compressed refrigerant is flown from compressors R4 and R6 to evaporator R2 and therefrom through refrigerant heat exchanger R3 to air-cooled condenser unit R1) the compression sub cycle R is operated in the heating mode (FIG. 7C).

Valves V24, V26 and V27, may be implemented by means of any suitable types of electronically controllable valves, or by means of an arrangement of controllable two-way and three-way valves. Control means (not shown—e.g., control logic, programmable logic controller—PLC, microcontroller, MCU, or the like) may be used to change the states of the controllable valves in the preferred embodiments of the invention described hereinabove, arbitrate the refrigerant streams and operate the compressor means as needed, which is within the skills of those versed in the art. As exemplified in FIG. 7C, when system 14s is operated in the heating mode, functionality of condenser R1 is performed by evaporator R2 and therefore pre-cooler unit 22' may optionally be used separately, or as a part of, evaporator R2 unit.

Advantageously, the present invention provides triple pressure absorption systems designs that use environmentally acceptable working refrigerants and absorbents fluids and utilize low energy heat sources. The expected COP (coefficient of performance) in preferred embodiments of the invention is about 0.7-1.3 (depends on operating conditions and the working fluids). By advanced control system the COP can be as high as the COP of compression cycle at the same condenser and evaporator conditions. As can be seen in example 2 the COP of the compression cycle alone is about 4.1.

Example 1

Table 1 provides expected temperature and pressure ranges in various components of the TPL single-stage cycle air-cooled system operating with R134a of the invention illustrated in FIG. 7A, as obtained in a computerized simulation. It is noted that features of the components in the system depend on the working fluids. In this example the presented data are for the R134a-DMETEG solution.

TABLE 1

| Component* | Flow pattern | Temperature range [° C.] | Pressure range [bar]** |
|---|---|---|---|
| Generator | Liquid Heat source | <140 | |
| | solution | <130 | <13.5 |
| Pre-Generator | Weak solution | 70 to 90 | <13.5 |
| | Mixed flow of strong solution and Refrigerant vapor | 70 to 90 | <13.5 |
| Mixer | Mixed flow of Weak solution and Refrigerant vapor | 70 to 90 | 5 to 10 |
| Pre-Absorber | Mixed flow of Weak solution and Refrigerant vapor | 60 to 90 | 5 to 10 |
| | Mixed flow of strong solution and Refrigerant vapor | 50 to 80 | <13.5 |
| Absorber | Mixed flow of Weak solution and Refrigerant vapor | <50 | 5 to 10 |
| | air | <45 | ~1 |
| Condenser | Refrigerant vapor to liquid | <50 | <13.5 |
| | air | <45 | ~1 |
| Refrigerant heat exchanger | Refrigerant liquid | 20 to 50 | <13.5 |
| | Refrigerant vapor | 0 to 40 | 2.5 to 3.5 |
| Evaporator | Refrigerant liquid to vapor | −5 to +5 | 2.5 to 3.5 |
| | Air or liquid | 0 to 10 | ~1 |
| Compressor 1 | Refrigerant vapor | 50 to 80 | 2.5 to 10 |
| Compressor 2 | Refrigerant vapor | 70 to 100 | 5 to 13.5 |

*Construction material: Brass, steel, stainless steel, etc. Sealing materials: depends on the working fluids properties, TABLE 1-continued

| Component* | Flow pattern | Temperature range [° C.] | Pressure range [bar]** |
|---|---|---|---|

**The pressure ranges which presented in this table are functions of the refrigerant. In this table the presented values are for the refrigerant R134a.

Example 2

The calculated results of a triple pressure level cycle system (TCa—S—C, shown in FIG. 7A) with R134a-DMETEG solution operating under the following conditions: Generator 110° C., air cooled condenser and absorber 50° C. and evaporator 0° C., are summarized in the table 2.

It is noted that inline the pressure drops are negligible. In this example:

Pressures [bar] —high=13.17, intermediate=9.43, low=2.93
COP=1.055, circulation ratio=2.072
kW/TR of the absorption cycle=0.658 and for the compression cycle=0.860

TABLE 2

* TCa-S-C * Absorptin/Compression Cycle with R134a - DMETEG

| 1 | 2 Solution-> | 3 t ° C. | 4 P bar | 5 z | 6 i | 7 | 8 Refrigerant-> | | 9 t ° C. | 10 P bar | 11 j |
|---|---|---|---|---|---|---|---|---|---|---|---|
| .10. | Pump | 50.16 | 13.17 | 0.5977 | 119.06 | | | | | | |
| .12s | pAs | 69.47 | 13.17 | 0.5160 | 129.86 | =>.12r | pAs | | 67.36 | 13.17 | 158.79 |
| .14s | pGs | 81.26 | 13.17 | 0.3868 | 138.06 | <=>.14r | pGs | | 74.43 | 13.17 | 160.56 |
| .1s. | Gen | 110.00 | 13.17 | 0.2224 | 157.23 | <=>. 1g | Gen | | 91.68 | 13.17 | 164.92 |
| .3.. | pGp | 74.47 | 13.17 | 0.2224 | 136.44 | .21. | vap | | 76.96 | 13.17 | 161.19 |
| .3e. | EQp | 90.45 | 9.43 | 0.2224 | 145.67 | .22. | Def | | 50.00 | 13.17 | 154.41 |
| | | | | | | .23. | Con | | 50.00 | 13.17 | 117.71 |
| | | | | | | .25. | HRl | | 30.95 | 13.17 | 110.49 |
| | | | | | | .26. | Evpi | | 0.00 | 2.93 | 110.49 |
| | | | | | | .27. | Evpo | | 0.00 | 2.93 | 147.72 |
| | | | | | | .28. | HRg | | 35.00 | 2.93 | 154.93 |
| .4.. | BP. | 74.47 | 9.43 | 0.2224 | 136.44 | <= .29. | Comp | | 74.36 | 9.43 | 161.79 |
| .5s. | Mix | 78.93 | 9.43 | 0.2827 | 138.11 | <=>.5r. | Mix | | 75.93 | 9.43 | 162.17 |
| .7s. | pAp | 58.75 | 9.43 | 0.4631 | 124.61 | <=>.7r. | pAp | | 58.75 | 9.43 | 158.06 |
| .8.. | Abs | 50.00 | 9.43 | 0.5977 | 118.98 | | | | | | |

Heat input/output in Kcal/hr for 1 kg/hr refrigerant

Qgen = 28.265, QpG = 22.278, QpA = 32.498, Qabs = 29.028
Qdef = 6.781, Qcon = 36.698, Qhr = 7.219, Qevp = 37.221
, Wcomp = 6.853, Wp = 0.170, Xevp = 0.220

| | | Sol. [kg/hr] | Ref. |
|---|---|---|---|
| Flow rates | Abs: | 2.0716 | 0.0000 (0.00% generated)] |
| | pAs: | 1.7217 | 0.3500 (35.00% generated)] |
| | pGs: | 1.3590 | 0.3627 (36.27% generated)] |
| | Gen: | 1.0716 | 0.2874 (28.74% generated)] |
| | Mix: | 1.1618 | 0.9098 (9.02% absorbed)] |
| | pA1p: | 1.5521 | 0.5195 (48.05% absorbed)] |

COP-absorption = 1.055, dPcomp1 = 6.50, kW/TR = 0.658
Comp-2, T30 = 88.5 C, Wcomp2 = 2.319 kcal/hr
COP(comp1 + comp2) = 4.1, dPcomp2 = 3.74, kWC/TR = 0.860
% = 0.766

Each point along the cycle is defined by the temperature [° C.], pressure [bars], weight fraction (for the solution) and enthalpies i, j [kcal/kg].
Each component is defined by the heat transfer [kcal/hr] and the mass flow rate [kg/hr].

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. An air-cooled absorption refrigerating system comprising: a generator in heat exchange relationship with a stream of heat transfer fluid or gas, a separator adapted to separate a stream from said generator into a weak refrigerant solution stream and a main refrigerant vapor stream, an air-cooled condenser to condense said main refrigerant vapor stream, an expansion valve to reduce the pressure of a condensed refrigerant stream from said air-cooled condenser, an evaporator to form an evaporated refrigerant stream from a stream from said expansion valve and to cool a surrounding material, a heat exchanger to exchange heat between said weak refrigerant solution stream and a high-pressure rich refrigerant solution stream, a mixer to produce a mixed stream from said evaporated refrigerant stream from said evaporator and from said weak refrigerant solution stream from said heat exchanger, an air-cooled absorber to reconstitute said mixed stream, and a pump to produce said high-pressure rich refrigerant solution stream from the reconstituted mixed stream from said air-cooled absorber, wherein said heat exchanger is split into a first and a second heat exchange stage; wherein i) the first heat exchange stage exchanges heat between said weak refrigerant solution stream and a stream of high-pressure rich refrigerant solution from said second heat exchanger stare; and ii) the second heat exchange stage exchanges heat between said mixed stream from said mixer and said high-pressure rich refrigerant solution stream from said pump, wherein said air-cooled absorber is adapted to reconstitute said mixed stream obtained from said second heat exchanger stare; and wherein said high-pressure rich refrigerant solution stream from said first heat exchange stage is adapted to be introduced into said generator.

2. The system according to claim 1 further comprising an additional heat exchanger adapted to exchange heat between said condensed refrigerant stream from said air-cooled condenser and said evaporated refrigerant stream from said evaporator.

3. The system according to claim 2, further comprising a main compressor to compress a stream of evaporated refrigerant obtained from said additional heat exchanger and introduce the compressed stream of evaporated refrigerant into said mixer.

4. The system according to claim 3, further comprising an additional compressor, or multistage compressor, adapted to compress a stream of compressed refrigerant from the main compressor and introduce said stream of compressed refrigerant from the main compressor into said air-cooled condenser.

5. The system according to claim 4, further comprising two three-way valves adapted to change said system between two operating states:
  i) a first three-way valve wherein a stream of compressed vapors from said main compressor is directed into the mixer and the main stream of refrigerant vapor is directed into said air-cooled condenser; and
  ii) a second three-way valve wherein a stream of compressed evaporate from said main compressor is directed into said additional compressor, a stream of compressed refrigerant from said additional compressor is directed into said air-cooled condenser, and said main stream of refrigerant vapor is precluded from reaching said air-cooled condenser.

6. The system according to claim 5, further comprising a controller adapted to change the states of said first and said second three-way valves, and operate said compressor means to change the state of said system between said two operating states.

7. The system according to claim 4, further comprising additional valves and conduits adapted to change the mode of operation of said system between two states:
  a heating mode wherein the compressed refrigerant stream from said additional compressor, or multistage compressor, is conducted into said evaporator, a stream of evaporated refrigerant from said evaporator is conducted into a first inlet of said additional heat exchanger, a stream of condensed refrigerant from said air-cooled condenser is conducted into a second inlet of said additional heat exchanger which is then conducted therefrom into said main compressor; and
  a cooling mode wherein the compressed refrigerant stream from the additional compressor, or multistage compressor, is conducted into said air-cooled condenser, a stream of condensed refrigerant from said air-cooled condenser is conducted into said first inlet of said additional heat exchanger, a stream of evaporated refrigerant from said evaporator is conducted into said inlet of said additional heat exchanger which is then conducted therefrom into said main compressor.

8. The system according to claim 7, further comprising a controller adapted to change the states of said additional valves, and operate said compressor to change the state of said system between the modes of operation.

9. The system according to claim 1, wherein said stream of heat transfer fluid or gas is supplied from a type of low grade heat source.

10. The system according to claim 1, further comprising an additional separator to separate said stream of high-pressure rich refrigerant solution from said first heat exchanger stage into an additional refrigerant vapor stream that is introduced into said main refrigerant vapor stream, and a solution that is introduced into the generator.

11. The system according to claim 1, further comprising an additional separator to separate said stream of rich refrigerant solution from said second heat exchange stage into a further refrigerant vapor stream that is introduced into said main refrigerant vapor stream, and a refrigerant solution that is introduced into said first heat exchange stage.

12. The system according to claim 1, further comprising a pre-cooler unit to cool said main refrigerant vapor stream provided to said air-cooled condenser to a temperature near its saturation temperature.

13. The system according to claim 6, wherein said mixer is a type of jet ejector mixer.

14. The system according to claim 1, further comprising a pressure reducer adapted to reduce the pressure of said stream of weak refrigerant solution provided to said mixer from said first heat exchange stage.

15. The system according to claim 1, wherein said refrigerant solution comprises an absorbent material
  based on one or more of the following phosphates: trimethylphosphate $C_3H_9PO_4$; triethylphosphate $C_6H_{15}PO_4$; tri n-butylphosphate $C_{12}H_{27}PO_4$, on a phosphonate dimethylmethylphosphonate $C_3H_9PO_3$,
  based on one or more of the following ethylene glycol materials: ethylene glycol $C_2H_6O_2$; dimethylether of tetraethyleneglycol $C_{10}H_{22}O_5$; 1,3-propanediol (trimethylene glycol) $C_3H_8O_2$,
  based on one or more N—C=O bonds selected from: N,N dimethylacetamide $C_4H_9NO$; N-methyl,2-pyrrolidinone(methyl-2-pyrrolidone,M-pyrrol) $C_5H_9NO$; N-methyl; e-caprolactam (hexahydro,1-methyl,2H-azepin 2-one) $C_7H_{13}NO$; 1,3-dimethyl,2-imidazolidinone (dimethyleneurea) $C_5H_{10}N_2O$; 1,3-dimethyl,3,4,5,6-tetrahydro-2-pyrimidinone (dimethylpropyleneurea) $C_6H_{12}N_2O$), or combinations thereof.

16. The system according to claim 1, wherein said refrigerant material is selected from the group consisting of: HFC, HFC refrigerants (R32-difluoromethane $CH_2F_2$, R152a—1,1 difluoroethane $CH_3CHF_2$, R134a—1,1,1,2 tetrafluoroethane $CH_2FCF_3$, R125—pentafluoroethane $CF_3CHF_2$, R226ea—1,1,1,2,3,3 hexafluoropropane $CF_3CHFCHF_2$, R226fa—1,1,1,3,3,3 heptafluoropropane $CF_3CH_2CF_3$, R227ea—1,1,1,2,3,3,3 heptafluoropropane $CF_3CHFCF_3$), R600a (iso-butane $(CH_3)_3CH$), and R630 (monomethylamine $CH_3NH_2$, —dimethylamine$(CH_3)_2NH$).

17. A method for cooling a refrigerated space comprising:
  mixing a stream of evaporated refrigerant with a stream of weak refrigerant solution to provide a mixed stream;
  producing a reconstituted solution stream by absorbing portions of the mixed stream by means of an air-cooled absorber;
  pumping said reconstituted solution into a heat exchanger wherein the heat exchanger is split into a first and a second heat exchange stage comprising:

i) a first heat exchange stage used for exchanging heat between said weak refrigerant solution stream and a stream of reconstituted solution from said second heat exchange stage, and conducting said weak refrigerant solution therefrom for use in said mixing; and ii) a second heat exchange stage to exchange heat between said mixed stream obtained in said mixing and said reconstituted solution stream, wherein said absorbing in said air-cooled absorber comprises reconstituting said mixed stream obtained from said second stage heat exchange;

evaporating refrigerant from a stream of said reconstituted solution from said first heat exchange stage by means of a generator being in heat exchange relationship with a stream of heat transfer fluid or gas;

separating a stream from said generator into said stream of hot weak refrigerant solution and a main refrigerant vapor stream;

condensing said main refrigerant vapor stream by means of an air-cooled condenser;

reducing the pressure of a stream of condensed refrigerant vapor from said air-cooled condenser and conducting said stream of condensed refrigerant vapor having reduced pressure into an evaporator; and evaporating said condensed refrigerant vapor having reduced pressure in said evaporator to form said stream of evaporated refrigerant and conducting said stream of evaporated refrigerant therefrom for use in said mixing.

18. The method according to claim 17, further comprising cooling said condensed refrigerant vapor stream from said air-cooled condenser by means of a cooler being in heat exchange relationship with said stream of evaporated refrigerant, and conducting said stream of evaporated refrigerant therefrom for use in said mixing.

19. The method according to claim 18, further comprising compressing a stream of evaporated refrigerant obtained from said cooler and using it in said mixing.

20. The method according to claim 19, further comprising conducting the stream of compressed refrigerant into said air-cooled condenser for condensing.

21. A method for cooling a refrigerated space having a stream of compressed refrigerant comprising arbitrating said stream of compressed refrigerant between two operation states wherein said stream of compressed refrigerant is used for the condensing according to claim 20.

22. The method according to claim 21, further comprising changing the mode of operation between two states:
a heating mode comprising conducting the stream of compressed refrigerant into said evaporator, conducting a stream of evaporated refrigerant from said evaporator into a first inlet of said cooler, conducting a stream of condensed refrigerant from said air-cooled condenser into a second inlet of said cooler and conducting it therefrom for the compressing; and
a cooling mode comprising conducting the compressed refrigerant stream into said air-cooled condenser, conducting a stream of condensed refrigerant from said air-cooled condenser into said first inlet of said cooler, conducting a stream of evaporated refrigerant from said evaporator into said second inlet of said cooler and conducting it therefrom for the compressing.

23. A method for cooling a refrigerated space having a stream of compressed refrigerant comprising arbitrating said stream of compressed refrigerant between two operation states wherein said stream of compressed refrigerant is used in the mixing according to claim 19.

24. The method according to claim 23, further comprising changing the mode of operation between two states:
a heating mode comprising conducting the stream of compressed refrigerant into said evaporator, conducting a stream of evaporated refrigerant from said evaporator into a first inlet of said cooler, conducting a stream of condensed refrigerant from said air-cooled condenser into a second inlet of said cooler and conducting it therefrom for the compressing; and
a cooling mode comprising conducting the compressed refrigerant stream into said air-cooled condenser, conducting a stream of condensed refrigerant from said air-cooled condenser into said first inlet of said cooler, conducting a stream of evaporated refrigerant from said evaporator into said second inlet of said cooler and conducting it therefrom for the compressing.

25. The method according to claim 17, wherein the stream of heat transfer fluid or gas is supplied from a type of low grade heat source.

26. The method according to claim 17, further comprising separating a stream of reconstituted solution obtained from said heat exchanger into an additional refrigerant vapor stream and conducting it into said main refrigerant vapor stream, and conducting a remaining stream of reconstituted solution into said generator.

27. The method according to claim 17, further comprising separating a stream of reconstituted solution from said second heat exchange stage into a further refrigerant vapor stream and conducting it into the main refrigerant vapor stream, and conducting a remaining stream of reconstituted solution into said first heat exchange stage.

28. The method according to claim 17, further comprising cooling the main refrigerant vapor stream provided to said air-cooled condenser to a temperature near its saturation temperature.

29. The method according to claim 17, further comprising reducing the pressure of said stream of weak refrigerant solution provided for use in said mixing from said first heat exchange stage.

30. An air-cooled absorption refrigerating system comprising:
a generator in heat exchange relationship with a stream of heat transfer fluid or gas,
a separator adapted to separate a stream from said generator into a weak refrigerant solution stream and a main refrigerant vapor stream,
an air-cooled condenser to condense said main refrigerant vapor stream,
an expansion valve to reduce the pressure of a condensed refrigerant stream from said air-cooled condenser,
an evaporator to form an evaporated refrigerant stream from a stream from said expansion valve and to cool a surrounding material,
a heat exchanger to exchange heat between said weak refrigerant solution stream and a high-pressure rich refrigerant solution stream,
a mixer to produce a mixed stream from said evaporated refrigerant stream from said evaporator and from said weak refrigerant solution stream from said heat exchanger,
an air-cooled absorber to reconstitute said mixed stream, and
a pump to produce said high-pressure rich refrigerant solution stream from the reconstituted mixed stream from said air-cooled absorber,
wherein said system further comprises an additional separator to separate said high-pressure rich refrigerant solution from the heat exchanger into an additional refrigerant vapor stream that is introduced into said main refrigerant vapor stream, and a solution that is introduced into said generator.

31. A method for cooling a refrigerated space comprising:

mixing a stream of evaporated refrigerant with a stream of weak refrigerant solution to provide a mixed stream;

producing a reconstituted solution by absorbing portions of said mixed stream by means of an air-cooled absorber;

pumping said reconstituted solution into a heater being in heat exchange relationship with a stream of hot weak refrigerant solution and conducting said weak refrigerant solution therefrom for use in said mixing;

evaporating refrigerant from a stream of reconstituted solution from said heater by means of a generator being in heat exchange relationship with a stream of heat transfer fluid or gas;

separating a stream from said generator into said stream of hot weak refrigerant solution and a main refrigerant vapor stream;

condensing said main refrigerant vapor stream by means of an air-cooled condenser;

reducing the pressure of a stream of condensed refrigerant vapor from said air-cooled condenser and conducting the same into an evaporator;

evaporating said condensed refrigerant in said evaporator to form said stream of evaporated refrigerant and conducting said stream of evaporated refrigerant therefrom for use in said mixing;

wherein the method further comprises separating a stream of reconstituted solution obtained from the heater into an additional refrigerant vapor stream and conducting said additional refrigerant vapor stream into the main refrigerant vapor stream, and conducting a remaining stream of reconstituted solution into the generator.

* * * * *

UNITED STATES PATENT AND TRADEMARK OFFICE
CERTIFICATE OF CORRECTION

PATENT NO. : 9,134,056 B2  
APPLICATION NO. : 13/394168  
DATED : September 15, 2015  
INVENTOR(S) : Avi Levy et al.

Page 1 of 2

It is certified that error appears in the above-identified patent and that said Letters Patent is hereby corrected as shown below:

IN THE CLAIMS

In claim 1, at col. 16, line 7, begin a new paragraph with "a generator";

In claim 1, at col. 16, line 8, begin a new paragraph with "a separator";

In claim 1, at col. 16, line 10, begin a new paragraph with "an air-cooled";

In claim 1, at col. 16, lines 11-12, begin a new paragraph with "an expansion";

In claim 1, at col. 16, line 13, begin a new paragraph with "an evaporator";

In claim 1, at col. 16, lines 15-16, begin a new paragraph with "a heat";

In claim 1, at col. 16, line 18, begin a new paragraph with "a mixer";

In claim 1, at col. 16, line 21, begin a new paragraph with "an air-cooled";

In claim 1, at col. 16, line 22, begin a new paragraph with "a pump";

In claim 1, at col. 16, line 65, begin a new paragraph with "wherein";

In claim 1, at col. 16, lines 66-67, begin a new paragraph with "i) the first heat";

In claim 1, at col. 17, line 3, change "stare" to --stage--;

In claim 1, at col. 17, line 3, begin a new paragraph with "ii) the second heat";

In claim 1, at col. 17, line 6, begin a new paragraph with "wherein said";

In claim 1, at col. 17, line 8, change "stare" to --stage--;

In claim 1, at col. 17, line 8, begin a new paragraph with "wherein said".

Signed and Sealed this  
Twenty-second Day of March, 2016

Michelle K. Lee  
*Director of the United States Patent and Trademark Office*

CERTIFICATE OF CORRECTION (continued)
U.S. Pat. No. 9,134,056 B2

IN THE CLAIMS

In claim 2, at col. 17, line 11, after "claim 1" insert --,--.

In claim 13, at col. 18, line 25, change "6" to --1--.

In claim 16, at col. 18, lines 32-33, delete the paragraph break between "material" and "based".